T. L. McCASKILL.
ROTARY HYDROCARBON ENGINE.
APPLICATION FILED JULY 14, 1916.

1,264,408.

Patented Apr. 30, 1918.
5 SHEETS—SHEET 2.

Witness
G. W. Baker
J. E. Kelley

Inventor
Thomas L. McCaskill
By Foster Furman Watson & Hiatt
Attorney

UNITED STATES PATENT OFFICE.

THOMAS L. McCASKILL, OF ALBANY, GEORGIA.

ROTARY HYDROCARBON-ENGINE.

1,264,408.

Specification of Letters Patent.   Patented Apr. 30, 1918.

Application filed July 14, 1916.   Serial No. 109,355.

*To all whom it may concern:*

Be it known that I, THOMAS L. McCAS­KILL, a citizen of the United States, and resident of Albany, county of Dougherty, State of Georgia, have invented certain new and useful Improvements in Rotary Hy­drocarbon-Engines, of which the following is a specification.

This invention relates to internal combus­tion engines and more particularly to the rotary type. The objects of the invention are to provide such an engine which is com­pact and occupies a minimum of space in proportion to the power developed; to pro­vide a novel arrangement of pump to com­press the explosive mixture; to provide a novel construction and arrangement of pump to circulate the cooling medium through the jackets; to provide a new construction of rotary abutment; to provide a combustion chamber in the rotary abutment; to provide means for cooling the piston; and gener­ally to improve the design, arrangement and efficiency of this type of engine. These and other features of the invention will be de­scribed in connection with the drawings, in which:

Fig. 5 is a longitudinal section taken sub­stantially on the line 5—5 of Fig. 3;

Fig. 6 is an elevation of the annular seal­ing ring;

Fig. 7 is a section through the piston taken substantially on the line 7—7 of Fig. 12;

Fig. 8 is a sectional detail showing the ro­tary abutment in the position for scaveng­ing the combustion chamber;

Fig. 12 is a detail showing the piston pass­ing over the rotary abutment;

Briefly stated, the engine comprises a cas­ing of substantially cylindrical form pro­vided in its interior with flanges which form an annular chamber in which operates the piston. This chamber is adapted to be ob­structed by a rotary abutment in which is formed a combustion chamber. A compres­sor or pump is located within the casing and substantially centrally thereof and is adapt­ed to compress the mixture of explosive fluid and discharge the same into a reservoir from which the charge is delivered to the combus­tion chamber of the rotary abutment. The rotary abutment is adapted to be oscillated so as to place the combustion chamber alter­nately in communication with the said res­ervoir and the annular chamber. Interme­diate of these two positions the combustion chamber is sealed and the charge of com­pressed mixture is fired. The piston is car­ried by a rotary member rigidly connected on a hollow shaft which extends through the casing. This rotor is formed with pumping means connected with the hollow shaft and the hollow shaft has conduit connections with the water jackets of the casing whereby the rotation of the rotor causes a circulation of the water through the jackets.

Figure 14:
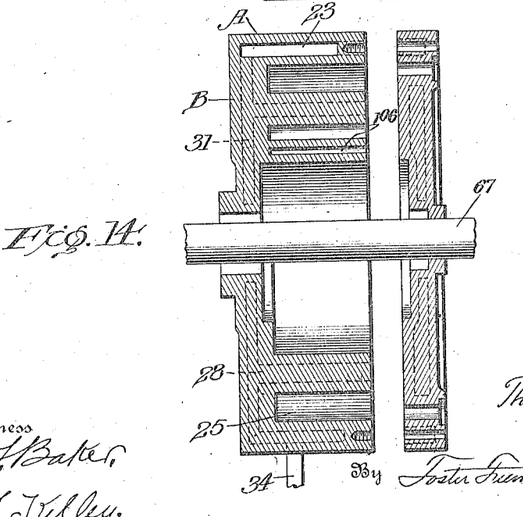
Fig. 14 is a section through the casing and the right hand head taken substantially on the line 14—14 of Fig. 4. This view shows the vertical web which divides the water jacket in the two heads.

As clearly shown in Figs. 1, 2, 3, and 5, the casing A is of substantially cylindrical form and may be provided with oppositely ex­tending feet 20, whereby it is supported. Spaced radially inside of the outer shell 21 of the casing is an axially extending flange or wall 22, thus forming between the shell and said wall a space 23 which is adapted to be used as a water jacket. Radially inside of the flange 22 is another concentric flange 24 forming an annular chamber 25 in which the piston 26 is adapted to slide. Radially inside of the flange 24 is another flange 27 which is eccentrically arranged with respect to the axis of the casing and forms a hous­ing for a rotary pump. The space 28 be­tween the flanges 27 and 24 is used as a wa­ter jacket. The water jackets 23 and 28 are divided vertically by webs 29 and 30. The casing has a head B which may be formed integrally therewith and a removable head C, which for a reason presently to be explained is formed in two parts. The head B is formed with a water jacket 31 which connects with the water jackets 28 and 23. The head C is also formed with water jackets 32 and 33. The latter jacket 33 is in communication with the outer water jacket 23 of the casing, while the inner jacket 32 is in communication with the water jacket 28 of the casing. As shown in Fig. 14, the jackets of these two heads are divided vertically by webs. This is for the purpose of causing a better circulation of the cooling medium through the jackets. It will be noted, however, that the outer jacket 23 in the casing has only one web 29 at the bottom thereof. This jacket is adapted to receive the cooling water through an inlet pipe 34, and it will be noted that the water may circulate circumferentially around the casing through the jacket 23 and be discharged through a discharge pipe 35, also that the water will pass from this outer jacket into the jackets of both the heads and from the latter jackets to the jackets 28 just inside of the annular chamber 25.

Figures 1, 2:
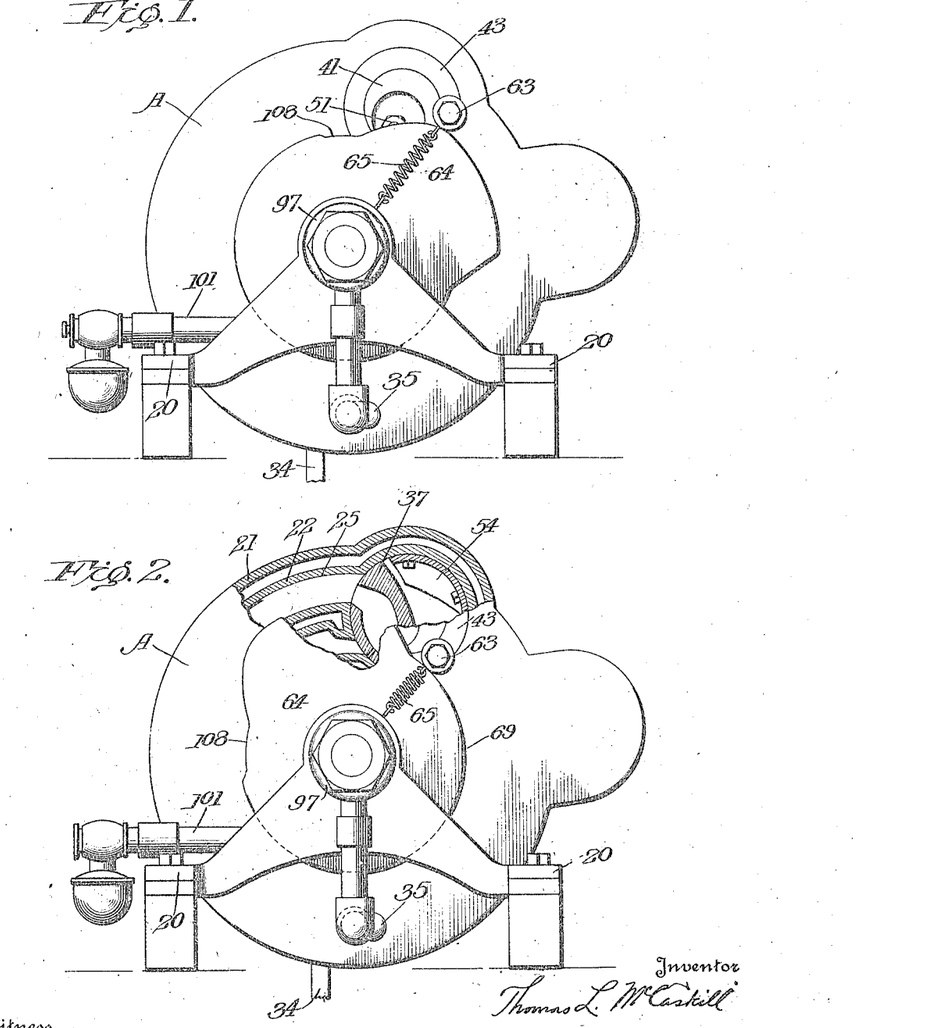
Figure 1 is an end elevation of the engine.
Fig. 2 is an elevation of the same end as shown in Fig. 1 but with the cam and rotary abutment in another position.
Figure 3:
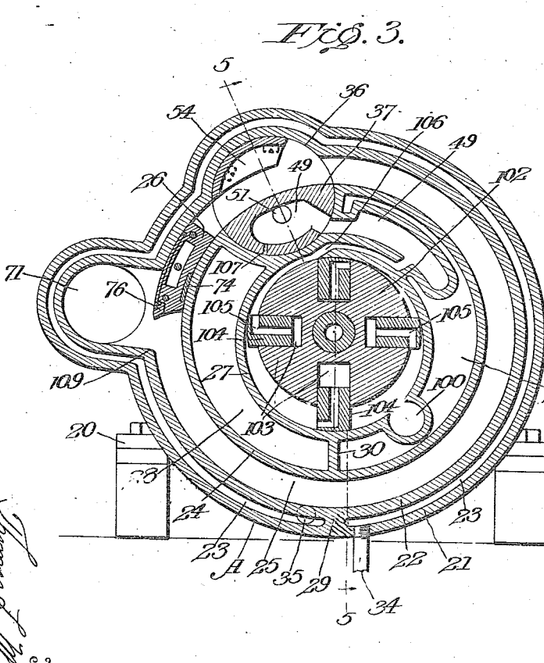
Fig. 3 is a section taken substantially on the line 3—3 of Fig. 5.
Figure 4:
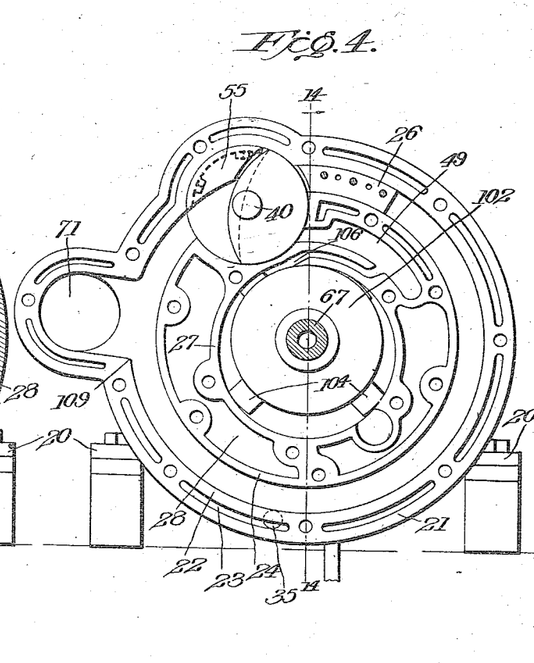
Fig. 4 is a side elevation with the right hand head of the casing removed, showing the water jackets and the lugs for the bolts for holding the said head to the casing.
Figure 5:
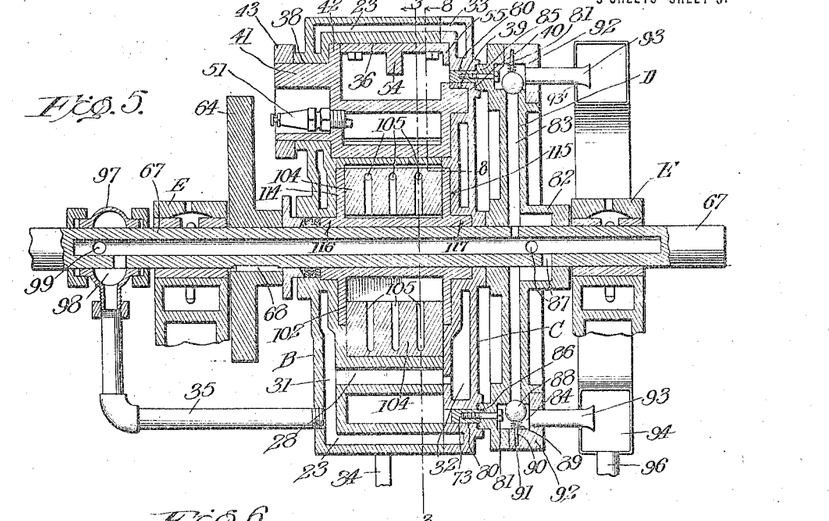

Near the top, the casing is formed with a bore 36 in which is adapted to be seated the rotary abutment 37. The axis of the rotary abutment extends transversely of the annular chamber 25. Arranged axially with the bore 36 is a bore 38 formed in the head B and a similar bore 39 formed in the head C. The rotary abutment is provided with a pin or lug 40 which is seated in the bore 39 and with a larger journal portion 41 which is seated in the bore 38. Thus the journal 41 and the pin 40 form means for rotatively supporting the rotary abutment. The journal 41 is prevented from moving longitudinally by an integrally formed circular flange 42 which is adapted to fit tightly against the head B and the outer circumferential surface of which is fitted in the bore 36. Movement in the other direction longitudinally is prevented by means of a removable collar 43 which may be fastened to the journal 41 by means of a set screw 44. Intermediate of the flange 42 and the pin 40 the rotary abutment is of substantially semi-cylindrical form. It has the outer semi-cylindrical surface 45 and an inner surface 46 which is curved on an arc about the axis of the casing as a center, and is adapted in one position to form a surface flush with the inner surface of the annular chamber 25. This same cylindrical portion of the rotary abutment is formed with a combustion chamber 47 which has a port 48 opening in the cylindrical surface 45. The rotary abutment is adapted to be rocked so that the port 48 is placed in communication with a reservoir 49, presently to be described, or with the annular chamber 25 as shown in Fig. 2. It will be noted that a bridge wall 50 separates the reservoir 49 from the annular chamber 25, and this wall is of sufficient width to seal the opening or port 48. The combustion chamber is provided with a spark plug 51 whereby a charge of explosive fuel in the said chamber may be fired, and the connections to the plug may be operated so that the charge will be fired while the opening 48 is sealed by the bridge wall 50. Arranged in the upper portion of the bore 36 is a plate 52 which is fastened by means of bolts 53 to the casing. This plate has a web 54 centrally arranged so that its inner surface is concentric with the axis of the casing and is adapted to form a continuation of the outer surface of the annular chamber. At the end adjacent the head C this plate is formed with another web or flange 55 which is of the outline shown in Fig. 4 and is adapted to form a stop limiting the oscillation of the rotary abutment in one direction. The collar 43 is formed with a boss 56 in which is threaded an axially extending pin 57. This pin has a portion 58 which carries a roller 59 held in position by a nut 60, and a reduced portion 61 on which is mounted a sleeve 62 held in position by a nut 63. The roller 59 is adapted to coöperate with a cam 64 and the sleeve 62 is adapted to have fastened thereto a spring 65, the other end of which is connected to a bearing E.

A hollow shaft 67 extends through the casing and adjacent the head B of the casing carries the cam 64 which may be fastened to the same by means of a key 68. The cam operates on the roller 59 and is for the purpose of moving the rotary abutment in one direction, the spring 65 being used to return the same. The outline of the cam is clearly shown in Figs. 1 and 2. When the roller is on the circular portion 69 of the cam the combustion chamber of the rotary abutment is in communication with the annular chamber 25, as shown in Fig. 2. When the roller is on the high portion 70 of the cam the combustion chamber of the rotary abutment is in communication with the reservoir 49. The extent of the circular portion and the high portion of the cam depends upon the relative angular location of the rotary abutment and the exhaust port. This exhaust port 71 is shown as being located adjacent to the rotary abutment. As viewed in Fig. 3, the direction of movement of the piston is clockwise, and measuring the angle in this direction the exhaust port may be located substantially from 240 to 300° from the rotary abutment.

Figures 6, 7, 8:
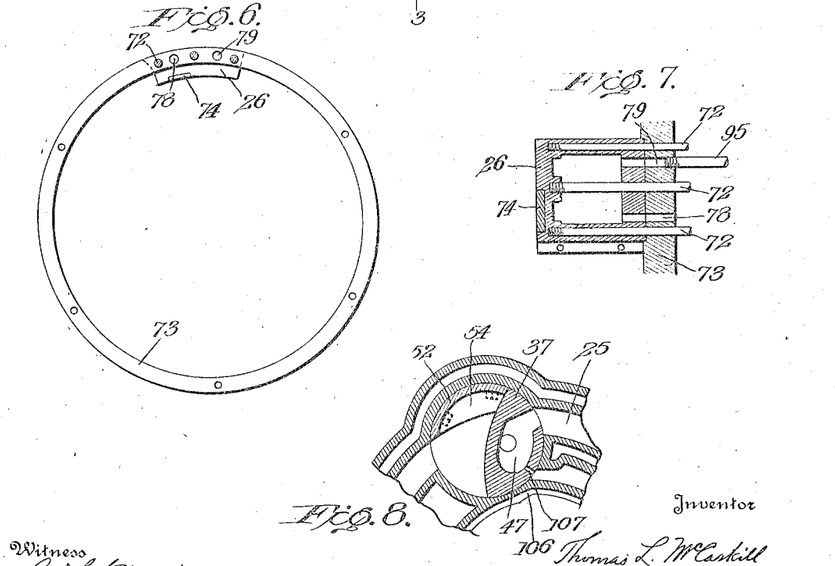
Figures 9, 10:
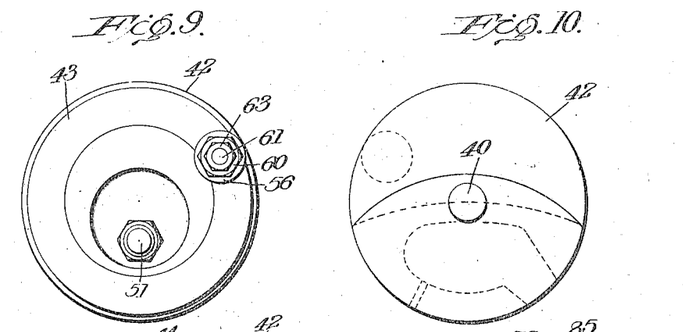
Fig. 9 is an end elevation of the rotary abutment.
Fig. 10 is an elevation of the opposite end from that shown by Fig. 9.
Figure 11:
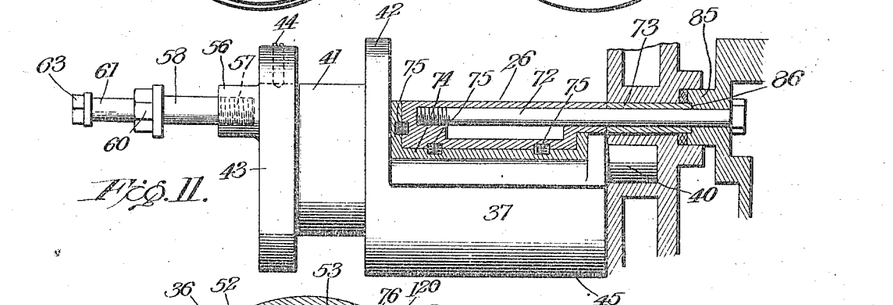
Fig. 11 is a side elevation of the rotary abutment and showing the piston and con­necting parts in section.
Figure 12:
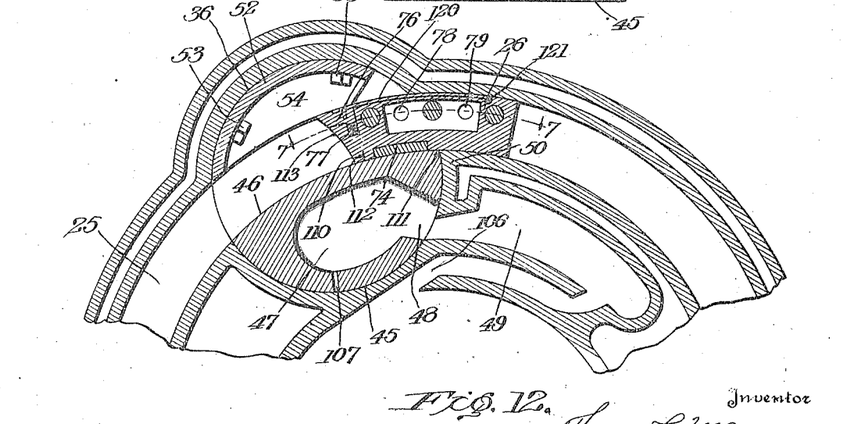
Figure 13:
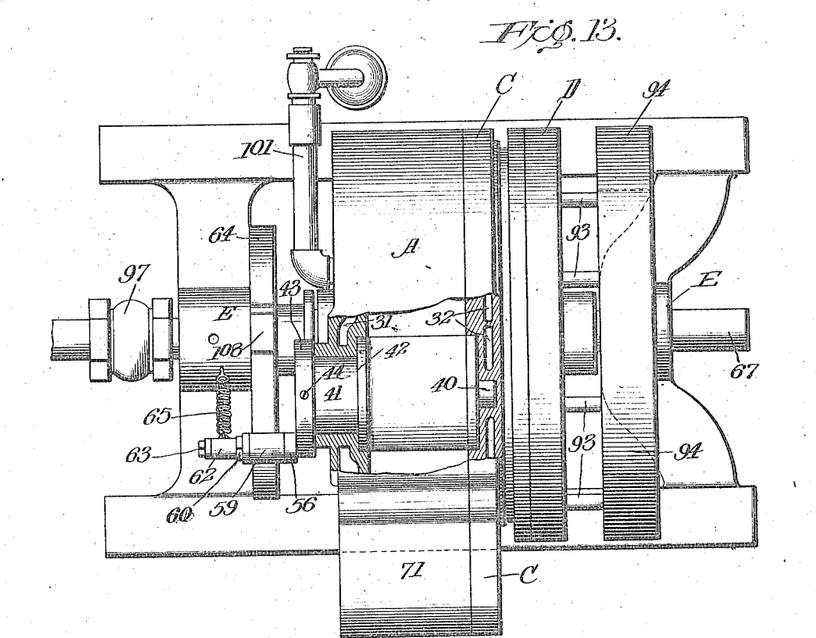
Fig. 13 is a plan view of the engine, the casing around the rotary abutment being cut away.

The fired charge of mixture is adapted to be liberated from the combustion chamber into the annular chamber and acts against the piston 26. The structure of this piston is clearly shown in Figs. 7, 11 and 12. It comprises a hollow segmental member fastened by means of bolts 72 to a ring member 73, which is carried by the rotary member or rotor D. A packing plate 74 is adapted to be pressed by means of springs 75 into contact with the walls of the annular chamber 25 to thereby form a gas-tight joint between the piston and the said walls. Another plate 76 (Fig. 12) on the upper side of the piston is pressed by means of springs 77 into contact with the outer cylindrical surface of the annular chamber. This plate is adapted to be held in position when passing the rotary abutment by the previously described web 54. The plate 76 may be attached to the piston in any preferred manner, as by means of a plate 120 set in flush with the outside surface of the piston and fastened to the plate 76 at one end and connected to the piston at the other end by a pin. As previously stated the piston is hollow and is formed with an intake passage 78 and a discharge passage 79. Water is adapted to be fed in through the intake passage and out through the discharge passage whereby the piston may be cooled. As the piston travels in a circular path and is carried by the rotor D which is outside of the casing, an annular slot 80 is provided through which the means for connecting the piston and the rotor extends. This slot is adapted to be sealed and the chamber 25 made gas-tight by means of the previously mentioned ring 73, which is carried by the rotor D by means of bolts 81. The rotor or rotative member D is rigidly connected to the hollow shaft and is in the form of a wheel having a hollow hub 82 and radially extending passages 83 connecting the hollow of the hub and an annular space 84 adjacent the rim of the rotor. Adjacent the sealing ring 73 the rotor is provided with a concentric axially extending flange 85 formed with an annular groove 86 and in which said ring is adapted to fit. Thus the ring is very rigidly connected to the rotor. The hollow hub and radially extending passages 83 of the rotor form a centrifugal pump. The hollow of the hub registers with openings 87 extending through to the interior of the hollow shaft 67. The outer end of the passages 83 are adapted to be closed by ball valves 88 which are pressed radially inward by springs 89 and are guided for radial movement by means of pins 90 extending from the balls and sliding in radial openings 91 in the rotor. These valves control the circulation of fluid from the passages 83 into the annular space 84. In order to assemble the device it is necessary to make the rotor D in two parts, the main or central portion and an outer removable rim portion 92, this latter portion being fastened to the main portion in any suitable manner. Horizontally arranged discharge pipes 93 are mounted in the said rim 92 and provide a means whereby fluid may be discharged from the annular space 84 into a circular casing 94, the pipes projecting through the annular slot 93' in the side thereof. The inlet passage 78 of the piston communicates with the annular space 84 of the rotor and the discharge passage 79 is continued by means of pipe 95 through the said rotor directly into the reservoir 94. Thus fluid may be taken from the hollow shaft and by means of the rotation of the rotor D pumped into the reservoir 94 and also circulated through the hollow piston. At the lower portion of the reservoir a discharge pipe 96 is provided which is adapted to connect with the inlet pipe 34 of the outer water jacket of the casing. The discharge pipe 35 from the casing jackets leads to a fitting 97 non-rotatively mounted on the shaft 67. This fitting is formed with an annular groove 98 in its interior which communicates with openings 99 leading into the interior of the shaft. Thus fluid circulating through the pipe 35 will be conducted to the interior of the said hollow shaft 67. This shaft may be mounted and supported in bearings E, although it is obvious that the casing itself might be designed to provide these bearings.

As previously mentioned, the casing A is formed with a centrally arranged eccentric housing 27 which is adapted to form part of a compressor or pump. This housing 27 is provided with an intake port or passage 100 which is connected by means of a pipe 101 to a source of supply of combustible fuel. Mounted on the shaft 67 and adapted to be driven thereby and to rotate within the housing 27 is a pump rotor 102. This rotor is of cylindrical form and is arranged so that one element of its surface is in contact with the housing 27. Thus an eccentric crescent shaped space is formed between the outer surface of the pump rotor and the inner surface of the casing 27. The rotor is formed with four slots 103 equally spaced around the circumference of the same. Pistons 104 are slidingly fitted in these slots and adapted to be reciprocated in the same by coöperation with the inner surface of the housing 27. These pistons are formed with a plurality of openings or passages 105 which connect the interior portion of the slots 103 and the eccentric space between the rotor and the housing. Thus it will be apparent that as the rotor revolves within the housing 27 that the explosive mixture taken in through the inlet port 100 will be carried around in the gradually diminishing eccentric space thereby compressing the same. The said mixture will be further compressed by the inward movement of the pistons 104 in the slots 103, the mixture thus compressed being discharged from the slots through the openings 105. As clearly shown in Figs. 3 and 4, the eccentric space leads into a discharge passage 106 which connects with the mixture reservoir 49. Thus mixture which is compressed by the rotary pump is discharged into the reservoir 49 which, as previously explained, communicates with the combustion chamber of the rotary abutment at certain parts of the cycle of operation.

The combustion chamber 47 in the rotary abutment is provided with means whereby the same may be scavenged just after the piston has opened up communication between the annular chamber and the exhaust 71. This means consists of a plurality of small holes 107 arranged as clearly shown in Figs. 3 and 12. The cam 64 is formed with a portion 108 which permits the rotary abutment to be rocked into the position illustrated in Fig. 8, wherein the openings 107 are placed in communication with the reservoir 49. Thus fresh compressed explosive mixture will pass through the openings 107 into the combustion chamber 47 and then into the annular chamber 25, thus clearing the combustion chamber of any incombustible gases that may be left therein. The openings 107 are placed in communication with the reservoir 49 only momentarily.

In the operation of the engine the explosive mixture is drawn into and compressed by the compressor or pump and discharged therefrom into the reservoir 49. The combustion chamber of the rotary abutment is placed in communication with the said reservoir, thus taking a charge of explosive mixture; it is then rotated by means of the spring so that it is momentarily sealed by the bridge wall 50 when it is exploded by a spark from the spark plug 51, produced by contact made on a timer (not shown) at this point. Further rotation brings the combustion chamber in communication with the annular chamber, thus the fired charge which is under a very high pressure is liberated and acts against the piston to drive the same around in the annular chamber. When the rear edge of the piston has cleared the edge 109 of the exhaust opening, the gases will be permitted to pass out through the exhaust passage 71. As soon as the pressure is thus relieved in the annular chamber the cam portion 108 permits the rotary abutment to be rocked so that the openings 107 are brought into communication with the reservoir 49 and thus the chamber is scavenged of any dead gases therein. As the piston is driven around in the annular chamber it causes the rotor D to revolve, thereby driving the hollow shaft 67 which may be connected to any desired device. As the rotor D is formed with pumping means it causes circulation of the cooling water in the manner previously described.

The operation of the rotary abutment is timed with respect to the position of the piston in the annular chamber. Of course, when the piston is about to pass by the rotary abutment, the latter member is in the position shown by Fig. 12. The cam is so designed that when the line indicated by 110 on the piston registers with the edge 111 of the rotary abutment, the spring 65 becomes operative to tend to rotate the abutment. Hence, when the edges 112 and 111 pass each other, the abutment will be snapped into its upper position, the edge 111 traveling along the curved face 113 of the piston. While it is being thus snapped the mixture is fired, and almost instantaneously liberated to act on the piston. The action is so quick that there is no time for leakage of the exploded charge from the combustion chamber.

It should be noted that the ends 114 and 115 of the pump rotor are seated in circular recesses in the heads B and C; and that bosses 116 and 117 are formed in the rotor and extend into the heads around the shaft 67, whereby a practically leak proof structure is effected. Any of the systems on the market may be used to ignite the charge, and it is not thought necessary to illustrate one, as they are well known.

It will be noted that by forming the rotor D with a pumping means and arranging the compressor within the engine casing that a compact engine is produced. Furthermore, it will be observed that all parts subjected to heat are very efficiently water jacketed.

Although a specific and at present preferred form of compressor has been described, it is obvious that other types of compressors might be used; also that other means might be employed for circulating the cooling water, and that the member, having the combustion chamber therein adapted to be placed in communication with a supply of fuel, then sealed and the charge fired, and the energy thus liberated utilized, might be used in other types of engines and for other purposes.

Having described the invention what is claimed is:

1. An internal combustion engine comprising a casing formed with an annular chamber, a piston slidingly fitted in said chamber, a rotary abutment formed with a combustion chamber, and adapted to periodically obstruct the annular chamber, means for placing the combustion chamber in communication with a supply of explosive mixture and thereafter with the first mentioned chamber, means for firing the explosive mixture while it is between the two positions, and means for scavenging the combustion chamber before a fresh charge of explosive mixture is admitted.

2. A rotary internal combustion engine having a casing formed with an annular chamber, a piston slidingly fitted in the chamber, a rotatably mounted abutment for the annular chamber formed with a chamber, means for placing the latter chamber in communication with a supply of explosive mixture and thereafter in communication with the annular chamber, means for firing the explosive mixture, and means for forcing fresh gas through the abutment chamber and into the annular chamber to scavenge the same.

3. A rotary engine comprising a casing formed with an annular chamber, a piston slidingly fitted in said chamber and rigidly connected to a shaft, means for actuating the piston and thus rotating the shaft by firing charges of explosive mixture, and a rotary pump arranged radially inside the annular chamber to compress the explosive mixture, the rotor of the pump mounted on said shaft.

4. A rotary engine comprising a casing formed with an annular chamber, a piston slidingly fitted in said chamber, a member formed with a chamber therein and a port through its wall, a pump arranged within the casing and adapted to compress explosive mixture and having a discharge passage, means for moving the said member to place the said port in communication with the discharge passage of the pump, and thereafter in communication with the annular chamber.

5. A rotary internal combustion engine comprising a casing formed with jacket spaces, a shaft, a revoluble member mounted on the shaft and driven by firing charges of compressed explosive mixture in the casing, said revoluble member formed with pumping means to circulate a cooling medium through the jacket spaces, and means within the casing driven by said shaft for compressing the mixture.

6. A rotary hydrocarbon engine including in combination, a casing having an annular chamber, a piston slidingly fitted in said chamber, a rotary abutment for said chamber having a portion arranged radially inside said chamber, said portion formed with a combustion chamber, and means to rotate said abutment to place the combustion chamber in communication with a supply of combustible mixture and thereafter with the first mentioned chamber.

7. A rotary hydrocarbon engine including in combination, a casing having an annular chamber, a piston slidingly fitted in said chamber, a rotary abutment for said chamber having a portion arranged radially inside said chamber, said portion formed with a combustion chamber, and a port therefor in the wall of the abutment, a supply of combustible mixture within the casing, and means to rotate said abutment to place the said port in communication with the said supply and thereafter with the first mentioned chamber.

8. A rotary hydrocarbon engine including in combination, a casing having an annular chamber, a piston slidingly fitted in said chamber, a rotary abutment for said chamber having a portion arranged radially inside said chamber, said portion formed with a combustion chamber and a port therefor in the wall of the abutment, means to rotate said abutment to place the port in communication with a supply of combustible mixture and thereafter with the first mentioned chamber, the seat for the rotary abutment acting to seal said port between the two positions, and means for exploding the mixture in the combustion chamber, when the port is thus sealed.

9. A rotary hydrocarbon engine including in combination, a casing having an annular chamber, a piston slidingly fitted in said chamber, a rotary abutment for said chamber having a portion arranged radially inside said chamber, said portion formed with a combustion chamber and a port therefor in the wall of the abutment, a pump for compressing the mixture arranged radially inside the annular chamber, and means to rotate said abutment to place the port in communication with the outlet of said pump and thereafter with the first mentioned chamber.

10. A rotary hydrocarbon engine including in combination, a casing having an annular chamber, a piston slidingly fitted in said chamber, a rotary abutment for said chamber having a portion arranged radially inside said chamber, said portion formed with a combustion chamber and a port therefor in the wall of the abutment, a pump for compressing the mixture arranged radially inside the annular chamber, and means to rotate said abutment to place the port in communication with the outlet of said pump and thereafter with the first mentioned chamber, the seat for the rotary abutment acting to seal said port between the two positions, and means for exploding the mixture in the combustion chamber when the port is thus sealed.

11. A rotary hydrocarbon engine including in combination, a casing having an annular chamber, a piston slidingly fitted in said chamber, a rotary abutment for said chamber having a portion arranged radially inside said chamber, said portion formed with a combustion chamber, a reservoir for compressed combustible mixture radially inside said annular chamber, and means to rotate said abutment to place the combustion chamber in communication with said reservoir and thereafter with the annular chamber.

12. A rotary hydrocarbon engine including in combination, a casing having an annular chamber, a piston slidingly fitted in said chamber, a rotary abutment for said chamber having a portion arranged radially inside said chamber, said portion formed with a combustion chamber, a reservoir for compressed combustible mixture radially inside said annular chamber, a pump for compressing the combustible mixture discharging into said reservoir, and means to rotate said abutment to place the combustion chamber in communication with said reservoir and thereafter with the annular chamber.

13. A rotary hydrocarbon engine including in combination, a casing having an annular chamber, a piston slidingly fitted in said chamber, a rotary abutment for said chamber having a portion arranged radially inside said chamber, said portion formed with a combustion chamber, a reservoir for compressed combustible mixture radially inside said annular chamber, a pump arranged radially inside the annular chamber for compressing the combustible mixture discharging into said reservoir, and means to rotate said abutment to place the combustion chamber in communication with said reservoir and thereafter with the annular chamber.

14. A rotary hydrocarbon engine including in combination, a casing having an annular chamber, a piston slidingly fitted in said chamber, a rotary abutment for said chamber having a portion arranged radially inside said chamber, said portion formed with a combustion chamber, and a port therefor in the wall of the abutment, a pump for compressing the combustible mixture, a discharge reservoir for the pump, said pump and reservoir arranged radially inside said annular chamber, means to rotate said abutment to place the port in communication with the reservoir and thereafter with the annular chamber, the seat for the rotary abutment acting to seal said port between the two positions, and means for exploding the mixture in the combustion chamber when the port is thus sealed.

In testimony whereof I affix my signature.

THOMAS L. McCASKILL.